United States Patent [19]

Stroz et al.

[11] Patent Number: 4,820,528

[45] Date of Patent: Apr. 11, 1989

[54] SWEETENER COMPOSITION

[75] Inventors: John J. Stroz, Randolph; Abraham I. Bakal, Parsippany, both of N.J.

[73] Assignee: Nabisco Brands, Inc., Parsippany, N.J.

[21] Appl. No.: 32,148

[22] Filed: Mar. 27, 1987

[51] Int. Cl.$^4$ .................. A23G 3/30; A23L 1/236
[52] U.S. Cl. ........................... 426/3; 426/96; 426/548; 426/658; 426/804
[58] Field of Search .................. 426/548, 658, 804, 3, 426/96

[56] References Cited

U.S. PATENT DOCUMENTS

| | | | |
|---|---|---|---|
| 3,098,749 | 7/1963 | Helgren | 426/548 |
| 3,746,554 | 7/1973 | Endicott | 426/548 |
| 3,773,526 | 11/1973 | Bliznak | 426/548 |
| 4,228,198 | 10/1980 | Burge et al. | 426/658 |
| 4,343,934 | 8/1982 | Jenner et al. | 426/658 |
| 4,405,654 | 9/1983 | Lee | 426/658 |
| 4,435,440 | 3/1984 | Hough | 426/658 |
| 4,495,170 | 1/1985 | Beyts et al. | 426/658 |
| 4,549,013 | 10/1985 | Hough et al. | 426/658 |
| 4,612,373 | 9/1986 | Khan et al. | 426/658 |

FOREIGN PATENT DOCUMENTS 3329764 2/1985 Fed. Rep. of Germany .

*Primary Examiner*—Jeanette Hunter
*Attorney, Agent, or Firm*—Richard Kornutik

[57] ABSTRACT

A sweetener composition consisting essentially of co-dried halodeoxysugar and acid saccharin and designed for use as a non-caloric sweetener in orally ingestible products such as chewing gum to provide prolonged sweetness without aftertaste of either the halodeoxysugar or the acid saccharin.

21 Claims, No Drawings

SWEETENER COMPOSITION

BACKGROUND OF THE INVENTION

1. Field of the Invention

The present invention relates to a sweetener composition which is a codried composition consisting essentially of acid saccharin and a halodeoxysugar compound. The sweetener is especially designed for use in comestible compositions which require prolonged release of sweetness values in the oral cavity of the user thereof.

2. Description of the Prior Art and Other Related Art

U.S. Pat. No. 4,495,170 discloses that synergistic sweetening compositions may be prepared from a bitter tasting intense sweetening agent such as saccharin, stevioside or acesulphame-K [6-methyl-1,2,3-oxathiazin-4(3K)-one,2,2-dioxide]and a chlorodeoxy sugar. The resulting compositions provide a higher level of sweetness than would be expected by combining the sweetness properties of the two materials. The compositions of U.S. Pat. No. 4,495,170 are disclosed as being useful in various products such as foods, beverages, pharmaceuticals, chewing gum and the like. The compositions of U.S. Pat. No. 4,495,170 are prepared by either dry mixing the two components thereof together, or by extending them with a solid or liquid carrier. The results disclosed in the patent indicate that it is necessary to use about 1:1 ratio of the two materials in order to obtain the optimum synergistic effect. This synergistic effect, however, is limited to an "up-front" type of sweetening effect which is obtained upon the immediate use of the composition. There is no evidence that any combination of the two sweetening materials, in any form, would provide for any prolonged sweetening effects under any use conditions.

U.S. Pat. Nos. 4228198 and 4292336 disclose the use of codried admixtures of thaumatin and/or monellin with saccharin and a carrier such as arabinogalactan or gelatin. In such compositions the thaumatin and/or monellin and saccharin are used at weight ratios to each other of about 1-4:10. The arabinogalactan of U.S. Pat. No. 4,228,198 is used, in part, to minimize sweetness duration and aftertaste. The gelatin of U.S. Pat. No. 4,292,336 is used to promote the heat stability of peptide sweeteners such as monellin and thaumatin.

In a copending U.S. patent application Ser. No. 918,403, filed Oct. 14, 1986, in the names of J.J. Stroz et al. and entitled Sweetener Composition, there is disclosed, as a novel sweetening agent composition, thaumatin and/or monellin codried on acid saccharin to provide a non-caloric sweetener for use in comestibles such as chewing gum to provide prologed sweetness in such products without an aftertaste from either the thaumatin/monellin or acid saccharin.

Heretofore, when halodeoxysugars and saccharin have been used together to avoid saccharin aftertaste problems, these two sweeteners have usually had to be used with extenders of one type or another, and at relavely high ratios of the halodeoxysugar sweetener to the saccharin.

Thus, prior to the present invention it has not been possible to effectively use the halodeoxysugar sweeteners together with acid saccharin at a low weight ratio of the halodeoxy sugar sweetener to the acid saccharin and/or without the need for any additional sweetness modifying compound and/or carrier therefor.

An object of the present invention, therefore, is to provide a means for employing halodeoxysugar sweeteners at relatively low levels of usage with acid saccharin while still obtaining relatively prolonged flavor release thereof, and avoidance of any undesirable aftertaste from the saccharin.

A further object of the present invention is to provide a means for employing acid saccharin with halodeoxysugar sweeteners without encountering aftertaste problems normally associated with the use of saccharin.

SUMMARY OF THE INVENTION

It has now been found, according to the present invention, that halodeoxy sugar sweetness can be effectively used in comestibles such as chewing gum at relatively low concentrations as flavor enhancers or sweeteners, and with saccharin at relatively low weight ratios of the halodeoxysugar sweetener to the saccharin if the halodeoxysugar sweetener is codried or otherwise encapsulated with only the saccharin.

DESCRIPTION OF THE PREFERRED EMBODIMENT

The Halodeoxy Sugar

The term The Halodeoxy Sugar as used in the context of the present invention includes all those halodeoxysugar compounds which have sweet tasting characteristics and wherein various of the hydroxyl groups of the sucrose compounds are replaced by halogen (chlorine, bromine, iodine and/or fluorine) atoms.

Such compounds would include the compounds of British Patent No. 1,543,167 and U.S. Pat. No. 4,435,440 wherein the hydrogen groups at certain combinations of the 4-, 6-, 1'-and 6'-positions are replaced by chlorine atoms, and wherein the 4'-position hydroxyl group is unsubstituted, and the compounds of U.S. Pat. No. 4,405,654 and U.K. 2,104,063 wherein the hydrogen groups at certain combinations of the 1-,4-,6-,1'-, 4' and 6' are replaced by halogen atoms, and the compounds of U.S. Pat. No. 4,473,546 wherein the hydogen groups at various combinations of the 4, 1' and 6' positions are replaced by chlorine and bromine atoms.

Other useful halodeoxysugar compounds and/or the preparation of various of the useful compounds are disclosed in U.S. Pat. Nos. 4,343,934; 4,389,394; 4,343,934; 4,362,869; and 4,380,476. The disclosures of all of such references noted above are incorporated herein by reference.

The preferred of The Halodeoxy Sugar compounds of the present invention are the chlorodeoxysucrose and the chlorodeoxygalactosucrose compounds. The most preferred of such compounds is 4,1',6' trichloro-4,1',6' trideoxygalactosucrose which is also known as 4-chloro-4-deoxy-α-D-galactopyranosyl-1,6-dichloro-1,6-dideoxy-β-D-fructo-furanoside. This compound is hereinafter referred to as "TGS".

Codried Composition

According to the present invention The Halodeoxy Sugar and saccharin are used to form what is believed to be a novel composition, that is, a codried composition consisting only of about 0.1 to 10, and preferably about 1.0 to 7, weight percent of The Halodeoxy Sugar and about 99.9 to 90, and preferably about 99.0 to 93 weight % of the saccharin. The Halodeoxy Sugar and the saccharin are thus used to form this composition in a weight ratio of The Halodeoxy Sugar to the saccharin of about 0.1:1 and preferably of about 0.01:1.

The codried composition is prepared by dissolving the desired weight ratios of The Halodeoxy Sugar and the acid saccharin in a suitable cosolvent such as ethyl alcohol, methanol, propylene glycol, acetone and glycerol, or miscible mixtures thereof, to form a solution of the two materials and then drying the solution so as to disperse The Halodeoxy Sugar on the saccharin which then functions as a carrier for The Halodeoxy Sugar. To be useful as a cosolvent in this regard the solvent must be capable of concurrently dissolving each of The Halodeoxy Sugar and the saccharin at room temperature and in a concentration of at least 0.2 grams/100 cc. The drying operation can be conducted by freeze drying the solution at temperatures below the freezing point of the solvent, or by spray or drum drying the solution at moderate temperatures of about 180° to 200° F., and below the decomposition points of The Halodeoxy Sugar and the saccharin.

The dried composition is a particulate material having an avarege particle size of up to about 200 microns, depending on the manner in which it is made.

Since The Halodeoxy Sugar as well as the saccharin are essentially non-caloric in nature, the composition thereof provides an essentially non-caloric high intensity sweetener composition.

The dried composition may be used as a non-caloric sweetener in various comestible or orally ingested products, particularly those of a chewy nature such as chewing gum, taffy, toffee, chewable mint candies, cream filling for candy, and other chewy confectionary products, chewable medicinals such as antacid tablets, breath protective tablets, vitamin and mineral supplement tablets, aspirin tablets or chewing gum and chewing tobacco.

When the composition of the present invention is used as a sweetening agent it is believed that the saccharin therein acts as a primary sweetening agent and that The Halodeoxy Sugar acts primarily to improve the sweetness of the saccharin. About 0.05 to 5, and preferably about 0.1 to 3, and most preferably about 0.1 to 2, weight % of the codried composition is used to sweeten the comestible products in which it is used. The codried composition would be added to the comestible product at the point in time when an intense sweetener would otherwise be added thereto based on the current state of the art of manufacturing such comestible products. It nents of the gum base and/or of the formulation as a whole.

The chewing gum products of the present invention would have the following general formulation:

| | WEIGHT % OF COMPONENT | |
|---|---|---|
| COMPONENT | BROAD RANGE | PREFERRED RANGE |
| gum base | 15 to 35 | 20 to 30 |
| gum base modifier | 0 to 5.0 | 0.3 to 3.0 |
| bulk sweetener | 0 to 90 | 40 to 65 |
| codried sweetener of present invention | 0.05 to 0.5 | 0.1 to 0.3 |
| coloring agent | 0.05 to 0.40 | 0.15 to .25 |
| other flavoring agent(s) | 0.5 to 2.5 | 0.8 to 1.2 |
| fillers | 0 to 35 | 0 to 30 |
| glycerin | 0 to 30 | 0 to 15 |
| Total | 100 | 100 |

GUM BASE

The composition of the gum base will vary depending on whether the gum base is to be used in a chewing gum product which is to be a regular, or non-bubble, gum product or a bubble gum product. For use in making a bubble gum or regular chewing gum product, the following gum base formulations may be used, in accordance with the present invention:

| | WEIGHT % OF COMPONENT IN GUM BASE FOR | | | |
|---|---|---|---|---|
| | BUBBLE GUM PRODUCT | | REGULAR GUM PRODUCT | |
| COMPONENT | Broad Range | Preferred Range | Broad Range | Preferred Range |
| masticatory material | 8–22 | 9–8 | 8–25 | 9–18 |
| plasticizer for masticatory material | 5–35 | 10–20 | 2–30 | 8–20 |
| hydrophilic detackifier | 0–30 | 4–10 | 5–35 | 10–25 |
| plasticizer for hydrophilic detackifier | 0–14 | 0–8 | 1–15 | 3–12 |
| wax | 3–15 | 5–10 | 4–20 | 8–15 |
| mineral filler | 0–35 | 10–22 | 0–35 | 15–30 |
| antioxidant | 0–0.1 | 0.05–0.09 | 0–0.1 | 0.03–0.09 |
| Total | 100 | | 100 | |

The masticatory substances are elastomeric materials acetate, polyvinyl butyl ether and copolymers or vinyl esters and vinyl ethers. The plasticizers for the hydrophilic type detackifiers would include lanolin, stearic acid and sodium stearate.

The plasticizers for the hydrophilic type detackifiers would include triacetin, acetylated glycerides and other flavor adjuvants such as ethyl acetate and triethyl citrate.

The waxes which are used serve primarily as compatibilizers. Examples of appropriate waxes are paraffin wax, candelilla wax, carnuba wax, microcrystalline waxes and polyethylene waxes.

The mineral fillers would include calcium carbonate, titanium dioxide, talc, alumina, dicalcium phosphate, tricalcium phosphate, magnesium hydroxide and mixtures thereof.

The gum base may also include a softening agent and lubricant combination which may comprise one or more hydrogenated vegetable or animal fats.

The gum base may also include about 0 to about 2.0%, and preferably about 0.1 to about 0.7% of an emulsifier to impart hydrophilic properties to the gum base. Examples of such emulsifiers includes phosphatides such as lecithin, in addition to that used in the gum base modifier, and mono-and diglycerides of these fatty acids and mixtures thereof, with glyceryl monostearate being preferred.

In addition, the gum base may include antioxidants such as butylated hydroxy toluene, butylated hydroxy anisole and propyl gallate.

The chewing gum compositions of the present invention can be sugar based or sugarless. The sugar or sugar substitute used in the compositions of this invention include natural sugars or non-sugar sweeteners. The amount of natural sugars which can be present in the final composition can range from 0 to about 90 weight percent. The amount of non-sugar sweetener which can be used can range from 0 to about 2 weight percent of the final composition. At least one of such sweeteners is employed.

The term "natural sugar" includes one or more sugar containing materials, for example, monosaccharides of 5 to 6 carbon atoms, such as arabinose, xylose, or sorbose or mixtures of two or more of the foregoing monosaccharides; disaccharides such as sucrose, for example, cane or beet sugar including sucrose and dextrose, lactose, maltose or cellobiose; and polysaccharides such as dextrin, or corn syrup solids. The intense sweeteners include poorly water-soluble, as well as water-soluble sweeteners, such as the free acid form of saccharin, sodium, calcium, or ammonium saccharin salts, aspartame (L-aspartyl-L-phenylalanine methyl ester), dihydrochalcones, glycyrrhizin, dipotassium glycyrrhizin, glycyrrhizic acid/ammonium salt, talin, acesulfame K, as well as Stevia rebaudiana (Stevioside), Richardella dulcifica (Miracle Berry), Dioscoreophylim cumminisii (Serendipity Berry), free cyclamic acid and cyclamate salts and the like or mixtures of any two or more of the above.

PREPARATION OF CHEWING GUM PRODUCT

The chewing gum products of the present invention are prepared by first separately preparing the gum base. To then prepare either a sugar base or sugarless chewing gum formulation, the gum base for the product is melted, at a temperature about 190 to 250° F., and the other components of the composition are added thereto. The resulting composition is uniformly admixed. This takes about 3 to 7 minutes for commercial sized batches of these formulations. Each of the components is usually separately added to the formulated composition and uniformly mixed in before the next component is added. All of the admixing operations are conducted at temperatures in the range of about 112° to 185° F., and preferably about 125° to 180° F. for a total mixing time, at such temperatures, of about 10 to 20 minutes. The operations do not have to be conducted under anhydrous conditions in preparing the compositions of the present invention, and any amounts of moisture that are normally present in the raw materials that are used in the compositions of the present invention do not usually have to be removed therefrom either prior to, or during, the formulating process.

The following examples are merely illustrative of the scope of the present invention and are not intended as a limitation upon the scope thereof.

EXAMPLE A

Preparation of Sweetening Agents

A series of four sweetening agent materials were prepared for comparison purposes to demonstrate the utility and unobviousness of the compositions of the present invention. Table I below lists each of such four compositions, and the procedures used in preparing them. Compositions 1 and 2 are those representing the present invention.

TABLE I

| Sweetening Agent Composition | Procedure Used To Prepare Sweetening Agent Composition |
| --- | --- |
| 1. Nine percent TGS co-dried with saccharin acid | One part by weight TGS and 10 parts by weight saccharin acid were dissolved in 200 proof ethyl alcohol. Alcohol evaporated off at 70° C., dried material passed through 140 mesh screen |
| 2. Six percent TGS co-dried with saccharin acid | One part by weight TGS and 15 parts by weight saccharin acid were dissolved in 200 proof ethyl alcohol. Alcohol evaporated off at 70° C., dried material passed through 140 screen |
| 3. Nine percent TGS blended with saccharin acid | One part by weight TGS dry mixed with 10 parts by weight saccharin acid and passed through 140 mesh screen |
| 4. Six percent TGS blended with saccharin acid | One part by weight TGS dry mixed with 15 parts by weight saccharin acid and passed through 140 mesh screen |

The specific halodeoxy compound used in these compositions was 4, 1', 6' trichloro - 4, 1', 6' trideoxygalacto-sucrose (TGS).

EXAMPLE B

Use of Example A Sweetener Compositions in Chewing Gum

Each of the four sweetener compositions prepared in Example A above were then used to sweeten the same chewing gum product at concentrations of 0.08 and 0.15 percent. The chewing gum product employed had the following composition, in each case, except for the composition and/or manner of use of the sweetener composition used therein. The composition of the chewing gum product was as follows:

TABLE II

| Chewing Gum Composition Component | Weight % of Component Employed Formulations | | | | | | | |
|---|---|---|---|---|---|---|---|---|
| | 1 | 2 | 3 | 4 | 5 | 6 | 7 | 8 |
| Gum Base, (SBR elastomer based) | 23.00 | → | → | → | → | → | → | 23.00 |
| Mannitol Powder | 16.00 | → | → | → | → | → | → | 16.00 |
| Sorbitol Powder | 39.00 | → | → | → | → | → | → | 39.00 |
| Sorbitol Syrup (70% solids) | 20.00 | → | → | → | → | → | → | 20.00 |
| Peppermint Oil | 1.00 | → | → | → | → | → | → | 1.00 |
| Spray Dried Peppermint | .50 | → | → | → | → | → | → | 0.50 |
| lecithin | .40 | → | → | → | → | → | → | 0.40 |
| Sweetener | | | | | | | | |
| Composition 1 | .08 | — | — | — | — | — | — | — |
| Composition 1 | — | 0.15 | — | — | — | — | — | — |
| Composition 2 | — | — | .08 | — | — | — | — | — |
| Composition 2 | — | — | — | 0.15 | — | — | — | — |
| Composition 3 | — | — | — | — | 0.08 | — | — | — |
| Composition 3 | — | — | — | — | — | 0.15 | — | — |
| Composition 4 | — | — | — | — | — | — | .08 | — |
| Composition 4 | — | — | — | — | — | — | — | .015 |

The Sweetener Composition used was one of sweetening agent compositions Nos. 1 to 4 prepared as in Example A above. In the case of such sweetener compositions 1 to 4, they were each blended into the chewing gum formulation as described below. Sweetener compositions No. 3 & 4 were used as controls.

EXAMPLE C

Preparation of Chewing Gum Products

Separate chewing gum products were then made with each of the four sweetener compositions of Example A and the chewing gum formulations of Example B using the following manufacturing procedure.

| Steps In Procedure | Activity in Step |
|---|---|
| 1. | Fully melt gum base to 220° F. Cool to 150° F. |
| 2. | Add mannitol and lecithin and mix 3 minutes. |
| 3. | Add powdered sorbitol and liquid flavor on top. Mix 3 minutes. |
| 4. | Add sorbitol group. |
| 5. | Add spray dried flavor and sweetener system. Mix 3 minutes until smooth. |
| 6. | Roll with mannitol to ⅜ to ¾" thick. |
| 7. | Finish roll to 68/1000". Cut into 3 gram sticks and wrap. |

Each formulation was made in the form of about a 2.2 pound or one kilogram lot, prior to being formed into stick configuration.

EXAMPLE D

Comparative Testing of Chewing Gum Products

Samples of each of the eight products made in Example C above were then concurrently tested, within 30 days after they had been made (and stored at 40% R.H., 85° F.) by a panel of five trained panelists selected for their taste acuity. All of the panelists had previously participated in similar tests and were familiar with the evaluation of chewing gum.

Each panelist received in each test session a coded three gram stick of chewing gum. Panelists were asked to evaluate each chewing gum sample at 1, 3, 5, 7, 10, 15 and 20 minutes of chewing for the following attributes:

1. Initial burst (of overall flavor & sweetness)-after 30 seconds of chewing
2. Sweetness
3. Overall flavor
4. Peppermint Flavor level
5. Aftertaste
6. Overall quality Each sample of chewing gum was tested once by each panelist. The panelist was asked to evaluate each sample by assigning a rating value over a range of 1 to 8 to the attributes being tested in accordance with the following scale of proposed values for such attributes, and at the end of each interval of test time (as shown in Table III below).

TABLE III

Test Scheme Outline

| Attribute | Numerical Range and Significance of Rating | | | | |
|---|---|---|---|---|---|
| | 0 | 1  2 | 3  4 | 5  6 | 7  8 |
| Initial burst | none | slightly perceptible | definite | strong | very strong |
| Sweetness | none | slightly perceptible | definite | strong | very strong |
| Overall flavor | none | slightly perceptible | definite | strong | very strong |
| peppermint flavor level | none | slightly perceptible | definite | strong | very strong |
| aftertaste | none | slightly perceptible | definite | strong | very strong |
| overall quality | dislike extremely | dislike moderately | neither like nor dislike | like moderately | like extremely |

After comparatively testing each product once, the numerical ratings assigned by the panelists to each product were compiled and were as follows, as shown in Tables IV to VII below.

TABLE IV
AVERAGE SENSORY SCORES OF CHEWING GUMS CONTAINING 0.08 PERCENT 10:1 SACCHARIN ACID/TGS

| | | Test Sample | |
|---|---|---|---|
| | Time (Minutes) | (5) Control | (1) Co-Dried |
| Initial Burst Sweetness | 0 | 5.2 | 5.0 |
| | 1 | 4.8 | 4.8 |
| | 3 | 3.2 | 3.4 |
| | 5 | 1.0 | 2.2* |
| | 7 | 0.2 | 1.6* |
| | 10 | 0.2 | 1.0* |
| | 15 | 0 | 0.6 |
| | 20 | 0 | 0.4 |
| Peppermint Flavor Intensity | 1 | 5.2 | 5.2 |
| | 3 | 4.2 | 3.8 |
| | 5 | 2.8 | 2.6 |
| | 7 | 2.8 | 2.4 |
| | 10 | 2.0 | 1.8 |
| | 15 | 1.8 | 1.2 |
| | 20 | 1.5 | 1.2 |
| Aftertaste Level | 1 | 1.0 | 0 |
| | 3 | 1.8* | 0.2 |
| | 5 | 2.0* | 0.2 |
| | 7 | 2.2* | 0.4 |
| | 10 | 1.8* | 1.0 |
| | 15 | 1.5 | 1.0 |
| | 20 | 1.5 | 1.0 |
| Overall Quality | 1 | 4.5 | 5.2 |
| | 3 | 3.8 | 4.4 |
| | 5 | 3.0 | 4.4 |
| | 7 | 3.0 | 3.8 |
| | 10 | 2.2 | 3.4 |
| | 15 | 1.8 | 3.4 |
| | 20 | 1.5 | 3.4 |

*Indicates significant difference at the 95 percent confidence level

TABLE V
AVERAGE SENSORY SCORES OF CHEWING GUMS CONTAINING 0.15 PERCENT 10:1 SACCHARIN ACID/TGS

| | | Test Sample | |
|---|---|---|---|
| | Time (Minutes) | (6) Control | (2) Co-Dried |
| Initial Burst Sweetness | 0 | 6.5 | 6.6 |
| | 1 | 6.5 | 6.2 |
| | 3 | 5.2 | 5.2 |
| | 5 | 4.2 | 4.2 |
| | 7 | 3.8 | 3.2 |
| | 10 | 2.2 | 2.0 |
| | 15 | 1.0 | 2.0* |
| | 20 | 0.8 | 1.8* |
| Peppermint Flavor Intensity | 1 | 5.8 | 5.4 |
| | 3 | 5.0 | 4.6 |
| | 5 | 4.0 | 4.6 |
| | 7 | 3.8 | 3.0 |
| | 10 | 3.2 | 2.2 |
| | 15 | 2.2 | 2.2 |
| | 20 | 2.0 | 2.0 |
| Aftertaste Level | 1 | 0 | 0 |
| | 3 | 0.2 | 0 |
| | 5 | 1.5* | 0 |
| | 7 | 1.8* | 0.8 |
| | 10 | 2.8* | 1.0 |
| | 15 | 2.5* | 1.0 |
| | 20 | 2.5* | 1.0 |
| Overall Quality | 1 | 6.0 | 6.0 |
| | 3 | 5.5 | 5.6 |
| | 5 | 5.0 | 5.2 |
| | 7 | 4.0 | 3.8 |
| | 10 | 3.5 | 3.4 |
| | 15 | 3.2 | 3.2 |
| | 20 | 3.0 | 3.2 |

*Indicates significant difference at the 95 percent confidence level

TABLE VI
AVERAGE SENSORY SCORES OF CHEWING GUMS CONTAINING 0.08 PERCENT 15:1 SACCHARIN ACID/TGS

| | | Test Sample | |
|---|---|---|---|
| | Time (Minutes) | (7) Control | (3) Co-Dried |
| Initial Burst Sweetness | 0 | 5.2 | 6.4 |
| | 1 | 5.0 | 6.2* |
| | 3 | 3.8 | 4.6* |
| | 5 | 2.5 | 2.8 |
| | 7 | 2.0 | 1.6 |
| | 10 | 1.2 | 1.4 |
| | 15 | 0.8 | 0.6 |
| | 20 | 0.8 | 0.4 |
| Peppermint Flavor Intensity | 1 | 5.0 | 4.4 |
| | 3 | 4.2 | 4.0 |
| | 5 | 3.5 | 3.6 |
| | 7 | 3.5 | 3.0 |
| | 10 | 2.8 | 2.4 |
| | 15 | 2.5 | 2.0 |
| | 20 | 2.0 | 1.8 |
| Aftertaste Level | 1 | 0 | 0 |
| | 3 | 0.8 | 0.4 |
| | 5 | 1.5* | 0.8 |
| | 7 | 2.0* | 1.2 |
| | 10 | 1.5 | 1.2 |
| | 15 | 1.2 | 1.2 |
| | 20 | 1.2 | 1.2 |
| Overall Quality | 1 | 5.0 | 5.6 |
| | 3 | 4.5 | 5.2 |
| | 5 | 4.2 | 4.8 |
| | 7 | 3.8 | 3.8 |
| | 10 | 3.5 | 3.0 |
| | 15 | 3.5 | 2.6 |
| | 20 | 3.5 | 2.6 |

*Indicates significant difference at the 95 percent confidence level

TABLE VII
AVERAGE SENSORY SCORES OF CHEWING GUMS CONTAINING 0.15 PERCENT 15:1 SACCHARIN ACID/TGS

| | | Test Sample | |
|---|---|---|---|
| | Time (Minutes) | (8) Control | (4) Co-Dried |
| Initial Burst Sweetness | 0 | 6.8 | 7.0 |
| | 1 | 6.2 | 6.6* |
| | 3 | 4.8 | 5.6* |
| | 5 | 3.2 | 4.2* |
| | 7 | 2.5 | 3.8* |
| | 10 | 1.8 | 3.4* |
| | 15 | 0.8 | 2.6* |
| | 20 | 0.5 | 2.0* |
| Peppermint Flavor Intensity | 1 | 5.0 | 6.4* |
| | 3 | 4.8 | 5.2* |
| | 5 | 3.5 | 4.4* |
| | 7 | 3.0 | 4.2* |
| | 10 | 2.5 | 3.8* |
| | 15 | 2.0 | 3.4* |
| | 20 | 1.5 | 2.8* |
| Aftertaste Level | 1 | 0 | 0 |
| | 3 | 0.2 | 0 |
| | 5 | 1.0* | 0 |
| | 7 | 1.2* | 0.6 |
| | 10 | 1.5* | 0.6 |
| | 15 | 1.0 | 0.6 |
| | 20 | 1.0 | 0.8 |
| Overall Quality | 1 | 5.8 | 6.0 |
| | 3 | 5.0 | 5.6 |
| | 5 | 4.2 | 5.2* |
| | 7 | 3.2 | 4.8* |
| | 10 | 2.5 | 4.8* |
| | 15 | 2.0 | 4.4* |
| | 20 | 2.0 | 4.4* |

*Indicates significant difference at the 95 percent confidence level

The data obtained in these studies clearly indicate that co-dried saccharin acid and TGS improves the sweetness lasting properties of chewing gums. The data, in general, indicate that a ratio of about 15 parts saccharin acid to one part TGS at a level of 0.15 percent in the chewing gum yields the most exceptional performance in terms of improvements in sweetness and flavor lasting and low level of aftertaste. This gum was judged by the panel as having significantly higher overall quality compared to the corresponding control.

What is claimed is:

1. A codried composition consisting essentially of about 99.9 to 90 weight % of acid saccharin and about 0.1 to 10 weight % of halodeoxysugar.

2. A codried composition as in claim 1 in which said haloeoxysugar is selected from the group consisting of chlorodeoxysucrose and chlorodeoxy and galactosucrose.

3. A codried composition as in claim 1 in which said halodeoxysugar comprises 4, 1', 6' trichloro-4, 1', 6'-trideoxygalacto-sucrose.

4. An orally ingestible product sweetened at least in part with the composition of claim 1.

5. An orally ingestible product sweetened at least in part with the composition of claim 2.

6. An orally ingestible product sweetened at least in part with the composition of claim 3.

7. An orally ingestible product as in claim 4 which is chewing gum.

8. An orally ingestible product as in claim 5 which is chewing gum.

9. An orally ingestible product as in claim 6 which is chewing gum.

10. Chewing gum as in claim 7 which comprises about 0.01 to 0.5 weight % of said codried composition.

11. Chewing gum as in claim 8 which comprises about 0.05 to 0.3 weight % of said codried composition.

12. Chewing gum as in claim 1 which comprises about 1 to 500 ppm of said halodeoxysugar and about 100 to 5000 ppm of acid saccharin.

13. Chewing gum as in claim 2 comprising about 5 to 100 ppm of said halodeoxysugar and about 200 to 5000 ppm of acid saccharin.

14. In a process for sweetening an orally ingestible product with an essentially non-caloric sweetening agent the improvement which comprises employing as said sweetening agent the composition of claim 1.

15. A process as in claim 14 in which said halodeoxysugar is selected from the group consisting of chlorodeoxysucrose and chlorodeoxy galactosucrose.

16. A process as in claim 15 in which said halodeoxysugar comprises 4, 1', 6'-trichloro-4, 1', 6'-trideoxygalacto-sucrose.

17. A process for preparing the composition of claim 1 which comprises dissolving said halodeoxysugar and said acid saccharin in a common solvent therefore and drying the resulting solution so that said acid saccharin functions as a carrier for said halodeoxysugar.

18. A process as in claim 17 which said halodeoxy sugar and acid saccharin are dissolved in ethyl alcohol.

19. An orally ingestible product as in claim 4 which comprises about 0.5 to 5 weight % of said codried composition.

20. An orally ingestible product as in claim 5 which comprises about 0.5 to 5 weight % of said codried composition.

21. An orally ingestible product as in claim 6 which comprises about 0.5 to 5 weight % of said codried composition.

* * * * *